United States Patent
Bartels et al.

(10) Patent No.: US 8,515,290 B2
(45) Date of Patent: Aug. 20, 2013

(54) METHOD FOR COUPLING TWO PULSED LASERS HAVING AN ADJUSTABLE DIFFERENCE OF THE PULSE FREQUENCIES, WHICH IS NOT EQUAL TO ZERO

(75) Inventors: Albrecht Bartels, Konstanz (DE); Raphael Gebs, Konstanz (DE)

(73) Assignee: Giga Optics GmbH, Konstanz (DE)

( * ) Notice: Subject to any disclaimer, the term of this patent is extended or adjusted under 35 U.S.C. 154(b) by 289 days.

(21) Appl. No.: 12/807,782

(22) Filed: Sep. 14, 2010

(65) Prior Publication Data

US 2011/0085573 A1 Apr. 14, 2011

(30) Foreign Application Priority Data

Sep. 14, 2009 (DE) .......................... 10 2009 041 156

(51) Int. Cl.
*H04B 10/04* (2011.01)

(52) U.S. Cl.
USPC ........... 398/183; 398/192; 398/195; 398/196; 398/33; 372/25; 372/32; 372/20; 372/50; 359/326; 359/332; 356/541; 356/484

(58) Field of Classification Search
USPC ................. 398/183, 182, 186, 187, 188, 192, 398/193, 194, 195, 196, 197, 198, 200, 201, 398/204, 205, 206, 207, 155, 33, 163; 372/25, 372/30, 32, 18, 20, 29.011, 29.016, 34, 38.02, 372/28, 29.023, 50; 359/326, 332; 356/541, 356/484, 437, 451, 450, 73.1
See application file for complete search history.

(56) References Cited

U.S. PATENT DOCUMENTS

| | | | | |
|---|---|---|---|---|
| 5,367,529 A | * | 11/1994 | Holsinger et al. | 372/30 |
| 6,396,856 B1 | * | 5/2002 | Sucha et al. | 372/25 |
| 7,957,435 B2 | * | 6/2011 | Rausch et al. | 372/25 |
| 8,023,540 B2 | * | 9/2011 | Kupershmidt | 372/32 |

OTHER PUBLICATIONS

A. Bartels et al., "Ultrafast time-domain spectroscopy based on high-speed asynchronous optical sampling," Review of Scientific Instruments 78, 035107, 2007, pp. 1-8. (Spec, pp. 2 and 7-8).

(Continued)

*Primary Examiner* — Hanh Phan
(74) *Attorney, Agent, or Firm* — Bachman & LaPointe, P.C.

(57) ABSTRACT

The invention relates to a method for coupling a first and second laser (1, 2) having an adjustable difference of their pulse frequencies, which is not equal to zero, wherein the method comprises the following steps:
  derivation of a first harmonic signal and a signal of the $M^{th}$ harmonic from the time progression of the light intensity of the pulses emitted by the first laser,
  mixing of the first harmonic signal and the signal of the $M^{th}$ harmonic, in order to obtain a first mixed signal,
  derivation of a second harmonic signal and a signal of the $N^{th}$ harmonic from the time progression of the light intensity of the pulses emitted by the second laser,
  mixing of the second harmonic signal and the signal of the $N^{th}$ harmonic, in order to obtain a second mixed signal, wherein the first and second harmonic signal and the $M^{th}$ and $N^{th}$ harmonic are selected in such a manner that the frequencies of the first and second mixed signal are identical, wherein the method furthermore comprises regulation of the pulse frequency and pulse delay of the first and/or second laser in a closed phase-locked loop, so that the relative phases of the first and second mixed signal remain constant, in terms of time, and the frequencies of the first and second mixed signal remain identical.

10 Claims, 5 Drawing Sheets

(56) References Cited

OTHER PUBLICATIONS

Figure 1:
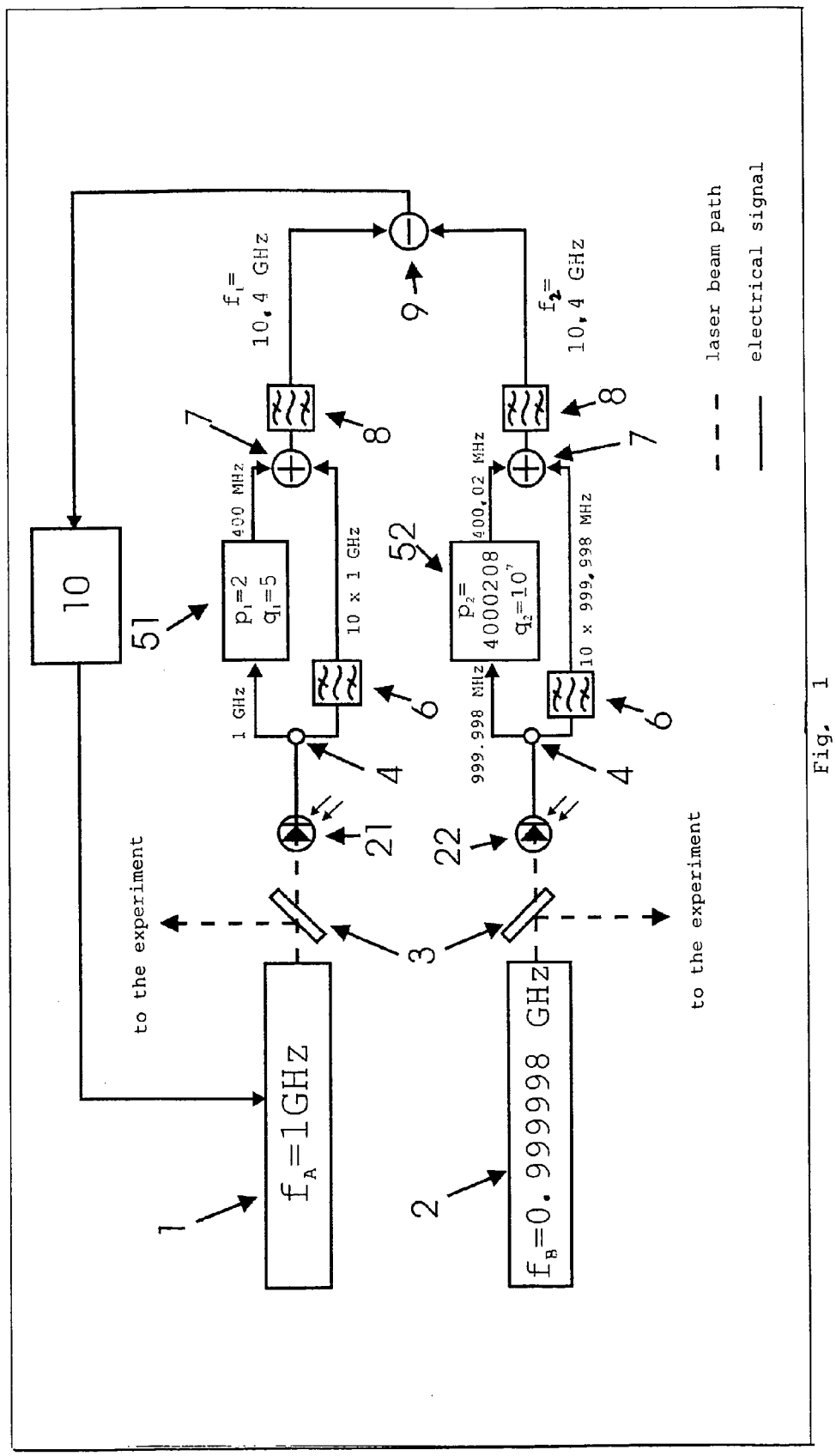

F. Keilmann et al., "Time-domain mid-infrared frequency-comb spectrometer," Optics Letters, vol. 29, No. 13, 2004, pp. 1542-1544. (Spec, p. 2).

"Halbleiterschaltungstechnik [Semiconductor technology]" by U. Tietze and Ch. Schenk, $9^{th}$ edition, 2002, Springer-Verlag, ISBN 978-3-540-42849-7, pp. 1284-1293. (Spec, p. 4).

"The Art of Electronics," Horowitz and Hill, $2^{nd}$ edition, 1989, Cambridge University Press, ISBN: 0-521-37095-7, pp. 641-651. (Spec, p. 4).

K. Holman, "Distribution of an ultrastable frequency reference using optical frequency combs," Dissertation, University of Colorado, USA, 2005 (also http://jilawww.colorado.edu/pubs/thesis/holman/holman_thesis.pdf); Appendix B, pp. 146-151.(Spec, p. 6).

Shelton et al., "Subfemtosecond timing jitter between two independent, actively synchronized, mode-locked lasers," Optics Letters, vol. 27, No. 5, 2002, pp. 312-314. (Spec, p. 12).

Shelton et al., "Phase-Coherent Optical Pulse Synthesis from Separate Femtosecond Lasers," Science, vol. 293, 2001, pp. 1286-1289. (Spec, p. 12).

"A Technical Tutorial on Digital Signal Synthesis", at http://www.analog.com/static/imported-files/tutorials/450968421DDS_Tutorial_rev12-2-99.pdf, 1999 Analog Devices, Inc. pp. 1-11. (Spec, p. 20).

Bar-Giora Goldberg, "Digital Frequency Synthesis Demystified—DDS and Fractional-N PLLs," LLH Technology Publishing, Eagle Rock 1999, ISBN 1-878707-47-7, pp. 26-29. (Spec, p. 20).

A. Bartels et al., "Terahertz-Spektroskopie mit High-Speed ASOPS [Terahertz Spectroscopy Based on High-Speed ASOPS]" tm—Technisches Messen [Technical Measuring] 75, 23-30 (2008). (Spec, p. 25).

G. Klatt et al., "Rapid and precise read-out of terahertz sensor by high-speed asynchronous optical sampling," Electronics Letters, vol. 45, No. 6, 2009, pp. 310-311. (Spec, p. 25).

T. Dekorsy et al., "Coherent acoustic phonons in nanostructures investigated by asynchronous optical sampling," Proceedings SPIE, vol. 6393, 2006, pp. 1-11. (Spec, p. 25).

\* cited by examiner

METHOD FOR COUPLING TWO PULSED LASERS HAVING AN ADJUSTABLE DIFFERENCE OF THE PULSE FREQUENCIES, WHICH IS NOT EQUAL TO ZERO

CROSS REFERENCE TO RELATED APPLICATIONS

Applicants claim priority under 35 U.S.C. §119 of German Application No. 10 2009 041 156.9 filed on Sep. 14, 2009, the disclosure of which is incorporated by reference.

The invention relates to a method for coupling two pulsed lasers with an adjustable difference of the pulse frequencies, which is not equal to zero, to a computer program product, as well as to a device for coupling two pulsed lasers with an adjustable difference of the pulse frequencies, which is not equal to zero.

Ignoring technically related fluctuations of the light emitted by lasers, the intensities of the light emitted by a first pulsed laser (also called laser A hereinafter) having a pulse frequency $f_A$, and a second pulsed laser (also called laser B hereinafter) having a pulse frequency $f_B$, can be formulated mathematically, in general, as $$I_A(t) = \sum_{k_n=-\infty}^{\infty} E_A\left(t - k_A \times \frac{1}{f_A} - t_A\right) \text{ and}$$

$$I_B(t) = \sum_{k_n=-\infty}^{\infty} E_B\left(t - k_B \times \frac{1}{f_B} - t_B\right).$$

In this connection, t indicates time and $E_A(t)$ and $E_B(t)$ refer to the time progression of the intensity of an individual pulse emitted by the laser, in each instance, centered around t=0. $t_A$ and $t_B$ are constants that indicate a time delay of all pulses of a pulsed laser; they are also referred to as pulse delay. According to the law of Fourier development, the time progression of the light intensities, in each instance, is composed of harmonic vibrations at multiples of the frequencies $f_A$ and $f_B$, respectively, also called Fourier components, as well as a component that is constant, in terms of time, in each instance. A harmonic vibration at the $K^{th}$ multiple of a pulse frequency is also referred to as its $K^{th}$ harmonic.

Technically related fluctuations, on the other hand, usually bring about the result that $f_A$, $f_B$, $t_A$, and $t_B$ are not constant, in terms of time. However, various applications require that at least $f_A-f_B$ is constant, in terms of time, and not equal to zero. Furthermore, $t_A-t_B$ must be constant, in terms of time. Such applications are, for example, asynchronous optical sampling or Fourier transform spectroscopy with two pulsed lasers that are slightly detuned in their pulse frequency. These applications are described in the publications by A. Bartels et al., "Ultrafast time-domain spectroscopy based on high-speed asynchronous optical sampling," Review of Scientific Instruments 78, 035107, 2007 and by F. Keilmann et al., "Time-domain mid-infrared frequency-comb spectrometer," Optics Letters 29, 1542, 2004. Fluctuations of $f_A$ or $f_B$ play a negligible role for these applications, as long as they lie below 1%, and $f_A-f_B$ and $t_A-t_B$ remain constant.

In general, phase-locked loops are used to stabilize the pulse frequencies (here $f_A$ and $f_B$) and the pulse delays (here $t_A$ and $t_B$) of pulsed lasers. Since phase-locked loops are electronic circuits, first part of the pulsed laser light has to be converted into an electrical signal. For this purpose, photodetectors are generally used. In this connection, the output signal of a photodetector reflects the progression of the incident light in terms of amplitude and phase, and thus follows the intensity of the incident light pulse train, with phase coherence. In this connection, it should be noted that as a result of the response function of the photodetector, Fourier components of the light intensity progression with frequencies above the cut-off frequency of the photodetector are weakened or actually eliminated. The output signal of the photodetector therefore essentially contains only Fourier components with frequencies up to the cut-off frequency of the photodetector.

In order to implement a phase-locked loop for stabilizing the pulse frequency of a pulsed laser, the pulse train of the laser is usually converted into an electrical signal by means of a photodetector. This electrical signal or a signal that is derived from it, in phase-coherent manner, is then compared with another signal, the reference signal, in a phase detector. In this connection, the output signal of the phase detector is proportional to the relative phase of its two input signals. In the case of a closed phase-locked loop, the output signal of the phase detector is amplified with a loop amplifier, and coupled back to the pulse frequency of the pulsed laser as a setting signal, in such a manner that the output signal of the phase detector assumes a constant value, in most cases zero. The output signal of the photodetector or the signal derived from it, in phase-coherent manner, has the same frequency as the reference signal. The pulse delay of the pulses from the pulsed laser is also constant relative to the reference signal. Fundamentally, the greatest possible amplification and bandwidth of the loop amplifier is advantageous for firm coupling of the pulse frequency of the pulsed laser to the reference signal. The reference signal can also be a signal derived from the pulse train of another pulsed laser. Basic information concerning phase detectors and phase-locked loops can be found, for example, in the books "Halbleiterschaltungstechnik [Semiconductor technology]" by U. Tietze and Ch. Schenk, $9^{th}$ edition, 2002, Springer-Verlag, ISBN 978-3-540-42849-7, and "The Art of Electronics," Horowitz and Hill, $2^{nd}$ edition, 1989, Cambridge University Press, ISBN: 0-521-37095-7.

Phase-coherent coupling of the light pulse trains of two pulsed lasers with an adjustable difference of the pulse frequency, which is not equal to zero, can be achieved with various methods.

In a known method, the signal is filtered out, in each instance, from the output signal of the two photodetectors, at a Fourier component of the same order. These two signals are then stabilized, in each instance, by tuning the pulse rates of the two pulsed lasers, individually, to the output signal of a reference signal generator, in each instance, by means of a setting signal in a phase-locked loop, in each instance. In this connection, the two signal generators possess a common reference oscillator. The desired difference of the pulse frequencies is adjusted by way of the output frequencies of the signal generators. For this method, it is necessary that the pulse frequency of the two pulsed lasers can be tuned. In this method, however, uncorrelated phase noise of the two signal generators, which is usually present despite the common reference oscillator, is imposed on the pulse trains of the pulsed lasers, so that $t_A-t_B$, in particular, is not sufficiently constant in terms of time. Residual fluctuations of $t_A-t_B$ typically lie in the range of 0.5 to 2 ps with this method.

In another known method, the light pulse trains of two pulsed lasers are coupled, in phase-coherent manner, at an adjustable difference of the pulse frequencies, which is not equal to zero, in that an electrical signal shifted by the desired difference is used as a reference signal at the first harmonic of the first pulsed laser, in a phase-locked loop for stabilization of an electrical signal at the first harmonic of the second pulsed laser. Here, as well, the electrical signals are obtained using a photodetector, in each instance. The frequency shift of the electrical signal at the first harmonic of the first pulsed laser is implemented by means of a single sideband generator. Details concerning a possible implementation of a single sideband generator can be found in the dissertation by K. Holman, "Distribution of an ultrastable frequency reference using optical frequency combs," Dissertation, University of Colorado, USA, 2005 (also http://jilawww.colorado.edu/pubs/thesis/holman/holman_thesis.pdf). In this method, the pulse frequency of the second pulsed laser is tuned using only one phase-locked loop. The pulse frequency of the second pulsed laser therefore follows that of the first pulsed laser at a constant frequency interval. Analogously, an electrical signal can also be coupled, at the $K^{th}$ harmonic of the pulse frequency of a pulsed laser, in phase-coherent manner, with the K-multiple difference frequency, to an electrical signal at the $K^{th}$ harmonic of the pulse frequency of the second pulsed laser. For this purpose, a signal shifted by K times the desired difference frequency is used as a reference signal, at the $K^{th}$ harmonic of the pulse frequency of the first pulsed laser, in a phase-locked loop, for stabilization of an electrical signal at the $K^{th}$ harmonic of the pulse frequency of the second pulsed laser. Here, again, only the pulse frequency of the second pulsed laser in the phase-locked loop is tuned. Details concerning such a method can be found in the publication by A. Bartels et al., "Ultrafast time-domain spectroscopy based on high-speed asynchronous optical sampling," Review of Scientific Instruments 78, 035107, 2007.

This method has the disadvantage that in the case of single sideband generators, in addition to the frequency-shifted useful signal, sidebands at a distance of the desired difference frequency or the K-times harmonic of the desired difference frequency are always formed, which cannot be eliminated by means of filters, particularly at low difference frequencies. In a phase-locked loop, these sidebands result in a parasitic, systematic modulation of the relative pulse delay $t_A-t_B$ between the pulse trains of the pulsed lasers, which bring about an undesirable deviation from the behavior in the case of ideal stabilization at a fixed difference frequency and a fixed relative pulse delay. The disadvantageous effect described can be reduced by means of using low-pass filters at the output of the phase detector in the phase-locked loop, but this can lead to disadvantageous restrictions of the usable bandwidth of the phase-locked loop.

An important application of two pulsed lasers coupled with an adjustable difference of the pulse frequency, which is not equal to zero, is asynchronous optical sampling. In a typical implementation, the light pulses from laser A with pulse frequency $f_A$ are used to repetitively bring about a reaction in a sample, for example a change in the optical properties or the emission of electromagnetic radiation. The pulses from laser B, at a slightly lower pulse frequency $f_B$, are then used to sample the development of the reaction as a function of the relative delay between the pulses from the two lasers, in suitable form, and to convert them to a measurable signal, for example by means of photodetection of laser B, thereby producing an electrical signal. Measurements according to this principle are described, for example, in the publication by A. Bartels et al., "Ultrafast time-domain spectroscopy based on high-speed asynchronous optical sampling," Review of Scientific Instruments 78, 035107, 2007). The relative delay τ between a pulse from laser A and the pulse from laser B that immediately follows it, in terms of time, depends on the real time t, in this connection, according to the following equation: $\tau(t)=t\times\Delta f_R/f_A$, where $\Delta f_R=f_A-f_B$. τ is therefore automatically varied, in linear manner, between zero and $1/f_A$, until a pulse from laser A and a pulse from laser B once again overlap, in terms of time, after a time period $1/\Delta f_R$ (in other words, τ=0 once again), and a new measurement cycle begins. This property represents the basic principle of asynchronous optical sampling. A representation of the reaction of the sample as a function of the relative delay τ of the laser pulses from lasers A and B can be achieved in that the signal obtained by means of laser B is detected and digitalized as a function of the real time t, and brought to a relative delay scale τ by multiplication of the time axis with the factor $\Delta f_R/f_A$. Usually, many measurement cycles are carried out during a measurement, and the data are averaged in order to reduce the noise.

The fundamental time resolution of an experiment with asynchronous optical sample is given by $\Delta\tau=|1/f_A-1/f_B|$. This value corresponds to the difference of the pulse-to-pulse interval of the lasers and thus to the incremental increase in the relative delay τ between a pulse from laser A and the pulse from laser B that immediately follows it, in terms of time, from one pulse pair to the next. A further restriction in the time resolution is given by the data point density that can be achieved, which results from the bandwidth of a data recording system B. The time resolution given by B amounts to $\Delta\tau_B=\Delta f_R/(f_A\times B)$. Furthermore, the time resolution is determined, in the final analysis, by interference-related deviations of $\Delta f_R$ from the nominal value. These bring about random deviations of τ from the nominal relationship $\tau(t)=t\times\Delta f_R/f_A$, which causes blurring of the signal, over time, due to the averaging of many measurement cycles that is necessary. This results in the need for the firmest possible phase-coherent coupling of the pulsed lasers at the desired difference of the pulse frequency $\Delta f_R$.

A further restriction of the time resolution in asynchronous optical sampling is the duration of the light pulses emitted by the pulsed lasers. Therefore, it is advantageous to use femtosecond lasers, since these can emit light pulses with a duration below 100 fs.

A fundamental problem in asynchronous optical sampling is that interference-related random deviations of the actual difference frequency from its nominally desired value bring about a deviation of the relative delay τ between the pulses from lasers A and B from their nominal value $\tau=t\times\Delta f_R/f_A$. Since data from many measurement cycles usually have to be averaged, in order to achieve a sufficient signal/noise distance, these deviations result in blurring of the signal, over time. These random deviations can occur, on the one hand, as the result of uncorrelated phase noise of two reference signal generators that are used, or, on the other hand, as the result of external interference (for example vibrations) of the lasers, which cannot be compensated by the phase-locked loop, to stabilize the difference frequency, due to lack of loop amplification or loop bandwidth. The problem of uncorrelated phase noise of signal generators cannot be easily solved.

However, in the case of stabilization by means of a single sideband generator, the loop bandwidth and/or the loop amplification can be increased, in order to bring about greater stabilization of $\Delta f_R$ and to reduce blurring of the measurement signal. However, this has the disadvantage that then, because of the sidebands at the interval $\Delta f_R$ or $K\times\Delta f_R$ of the single sideband generator, systematic interference is imposed on the relative pulse delay $t_A-t_B$ of the pulsed lasers to a stronger degree, at precisely this frequency, and this brings about systematic deviation of the time delay τ from the nominal function $\tau=t\times tf_R/f_A$, which is the same in every measurement cycle. An undesirable systematic incorrect calibration of the relative delay axis results from this.

In general, the use of signals having the highest possible frequency, which are derived from the output signals of the photodetector, in phase-coherent manner, particularly the use of signals that are derived from signals at higher harmonics of the pulse frequencies $f_A$ and $f_B$, is advantageous for frequency stabilization of the pulse rates of the lasers in a phase-locked loop. Signals at higher harmonics can be isolated with bandpass filters, for example. The stated advantage is attributable to the fact that in the vicinity of the working point of a closed phase-locked loop, the same relative time shift of two input signals, for example caused by an interference-related change of $t_A$-$t_B$, brings about a change in the output signal of a phase detector that is greater by a factor of K when the $K^{th}$ harmonic is used. Since the phase-locked loop reacts to specifically these changes, it therefore becomes more sensitive, by a factor of K, to time shifts of the input signals of the phase detector that result from external interference, and thus can compensate for interference-related changes in $t_A$-$t_B$ more efficiently. Details concerning stabilization of the pulse frequency of a pulsed laser, using higher harmonics, and concerning the advantages of this method, can be found in the publications by Shelton et al., "Subfemtosecond timing jitter between two independent, actively synchronized, mode-locked lasers," Optics Letters 27, 312, 2002 and by Shelton et al., "Phase-Coherent Optical Pulse Synthesis from Separate Femtosecond Lasers," Science 293, 1286 (2001).

An important characteristic variable of a phase-locked loop for stabilization of a pulse repetition rate of a pulsed laser to a reference signal is the remaining uncertainty of the time relationship between the two signals (in English: 'timing jitter'). It has been shown that a timing jitter below 100 fs can be achieved only when using harmonics in the range of approximately 1-20 GHz at the input of the phase detector for phase stabilization of the pulse repetition rate of a pulsed laser to a reference signal.

As compared with this, the invention is based on the task of creating an improved method for coupling two pulsed lasers with an adjustable difference of the pulse frequencies, which is not equal to zero, a computer program product, and an improved device for coupling two pulsed lasers with an adjustable difference of the pulse frequencies, which is not equal to zero.

The tasks on which the invention is based are accomplished by means of the characteristics of the independent claims. Preferred embodiments of the invention are indicated in the dependent claims.

A method for coupling a first and second laser with an adjustable difference in their pulse frequencies, which is not equal to zero, is indicated, whereby the method comprises the following steps:

derivation of a first harmonic signal and a signal of the $M^{th}$ harmonic from the time progression of the light intensity of the pulses emitted by the first laser, mixing of the first harmonic signal and the signal of the $M^{th}$ harmonic, in order to obtain a first mixed signal, derivation of a second harmonic signal and a signal of the $N^{th}$ harmonic from the time progression of the light intensity of the pulses emitted by the second laser, mixing of the second harmonic signal and the signal of the $N^{th}$ harmonic, in order to obtain a second mixed signal, whereby the first and second harmonic signal and the $M^{th}$ and $N^{th}$ harmonic are selected in such a manner that the frequencies of the first and second mixed signal are identical, whereby the method furthermore comprises regulation of the pulse frequency and pulse delay of the first and/or second laser in a closed phase-locked loop, in such a manner that the relative phases of the first and second mixed signal remain constant, in terms of time, and the frequencies of the first and second mixed signal remain identical.

The advantage of this method is that in this manner, no uncorrelated phase noise of two reference signal generators is imposed on the pulse trains of the lasers.

According to an embodiment of the invention, the derivation of the first harmonic signal takes place by means of manipulation at the pulse frequency or an $W^{th}$ harmonic of the pulse frequency of the first laser, with an electronic element, and/or the derivation of the second harmonic signal takes place by means of manipulation at the pulse frequency or an $N'^{th}$ harmonic of the pulse frequency of the first or second laser, with an electronic element.

According to another embodiment of the invention, the $M^{th}$ and $N^{th}$ harmonics of the pulse frequency of the first and second laser are selected in such a manner that their frequencies lie maximally at the highest possible input frequency of the electronic element being used.

This has the advantage that the problem of the sidebands of the reference signal, when using single sideband generators in the phase-locked loop, in the case of a stabilization method according to the invention, no longer occurs, since the output signals of a DDS electronic element do not have any sidebands that cause interference. Therefore the loop amplification and loop bandwidth of the phase-locked loop being used can assume significantly higher values, no longer influenced by the method for adjusting the difference frequency. Thus, a firmer coupling of the pulse trains of the pulsed lasers can be achieved, without any incorrect calibration of the time delay axis, with lower deviations of the actual difference frequency from the nominal value.

According to another embodiment of the invention, the $M^{th}$ and $N^{th}$ harmonics of the pulse frequency of the first and second laser are selected in such a manner that their frequencies lie between 900 and 1100 MHz.

According to another embodiment of the invention, derivation of the $M^{th}$ and $N^{th}$ harmonic takes place with an electronic element, whereby the $M^{th}$ and $N^{th}$ harmonics are selected in such a manner that their frequencies lie above the highest possible input frequency of the electronic element being used. For example, the $M^{th}$ and $N^{th}$ harmonics are selected in such a manner that their frequencies lie between 900 and 20000 MHz.

According to an embodiment of the invention, the electronic element comprises an electronic element for direct digital synthesis (DDS).

According to another embodiment of the invention, the first laser emits pulses at a pulse frequency $f_A$ and the second laser emits pulses at a pulse frequency $f_B$, whereby the signal of $M^{th}$ harmonic is given by $M \times f_A$ and the signal of Nth harmonic is given by $N \times f_B$, whereby the frequency a. of the first harmonic signal is given by $f_1=(M\pm M'\times p_1/q_1)\times f_A$, b. of the second harmonic signal is given by $f_2=(N\pm N'\times p_2/q_2)\times f_B$ or $f_2=N\times f_B\pm N'\times(p_2/q_2)\times f_A$, where p1 and q1 are whole numbers with p1 less than or equal to q1, and $p_2$ and $q_2$ are whole numbers with $p_2$ less than or equal to $q_2$, where M, M', N, N', $p_1$, $p_2$, $q_1$, $q_2$ can be preselected and determine the value of the difference of the pulse frequency $f_A$-$f_B$ of the two pulsed lasers (1, 2) at $f_1=f_2$ and constant phase.

In other words, according to an embodiment of the invention, coupling of two pulsed lasers takes place, with an adjustable difference of the pulse frequency, which is not equal to zero, for example using a phase-locked loop, in which the phase detector receives input signals with the following frequencies, which are derived, in phase-coherent manner, from the output signals of the photodetectors:

$$f_1 = (M \pm M' \times p_1/q_1) \times f_A \text{ and}$$

$$f_2 = (N \pm N' \times p_2/q_2) \times f_B$$

or $$f_1 = (M + M' \times p_1/q_1) \times f_A \text{ and}$$

$$f_2 = N \times f_B \pm N' \times p_2/q_2 \times f_A.$$

The factors M', N' can optionally be used with a positive or negative prefix. In this connection, M, M', N, N', $p_1$, $p_2$, $q_1$, $q_2$ are preselectable and determine the value of the difference $f_A - f_B$ of the pulse frequencies of the two pulsed lasers with a closed phase-locked loop, i.e. at $f_1 = f_2$ and constant phase between the input signals of the phase detector. In this connection, the factors M and N are advantageously achieved by using electrical signals at the $M^{th}$ and the $N^{th}$ harmonic, respectively, of $f_A$ and $f_B$, respectively. High harmonics in such a manner that $M \times f_A$ and $N \times f_B$ lie in the range of 900 MHz to 20000 MHz, for example, are advantageous because of the resulting greater sensitivity of the phase-locked loop. Signals at the harmonics, in each instance, can be isolated by means of bandpass filters, for example. The factors $M' \times p_1/q_1$ and $N' \times p_2/q_2$ are achieved by means of processing electrical signals at the $M'^{th}$ and the $N'^{th}$ harmonic, respectively, of $f_A$ and $f_B$, respectively, in an electronic element, for example for direct digital synthesis (DDS) of frequencies. In this connection, the DDS electronic element ensures multiplication of the M'th and N'th harmonic, respectively, with a factor of $p_1/g_1$ and $p_2/q_2$, respectively. To fulfill the Nyquist criterion, it preferably holds true that $p_1/q_1 < 0.5$ or $p_2/q_2 < 0.5$, respectively, i.e. the maximal output frequency of the DDS electronic element lies below half the maximal input frequency. In this connection, the summation or subtraction of $M \times f_A$ and $M' \times (p_1/q_1) \times f_A$ or of $N \times f_B$ and $N' \times (p_2/q_2) \times f_B$ or of $N \times f_B$ and $N' \times (p_2/q_2) \times f_A$, respectively, to produce the signals at $f_1$ and $f_2$, is advantageously performed in an electronic mixer. Since an electronic mixer can also make a contribution with the difference frequency of its input signals, as well as other undesirable contributions, it is generally advantageous to follow it with a bandpass filter that only allows the signal at the desired sum or difference frequency to pass through. The output signal of the phase detector is then coupled back to the pulse frequency and pulse delay of at least one of the pulsed lasers, by means of a loop amplifier in a phase-locked loop, in such a manner that the output signal of the phase detector assumes a constant value, in terms of time, so that the pulse trains of the two pulsed lasers operate in phase-coherent, coupled manner, with an adjustable difference of the pulse frequency, which is not equal to zero.

As has already been mentioned above, it is generally advantageous, in order to make available the highest possible input frequencies for the phase detector, to select N' and M' in such a manner that $M' \times f_A$ and $N' \times f_B$ or $N' \times f_A$, respectively, lie as close as possible to the maximal input frequency that can be processed by the DDS electronic element, and to use N' and M' with a positive prefix.

Fundamentally, $M \times f_A$ and $N \times f_B$ are not restricted to frequencies below 20000 MHz. However, at frequencies that lie above this, technically suitable components for a phase-locked loop are only available with restrictions, or not at all (particularly photodetectors, phase detectors, bandpass filters).

Alternatively, it is also possible to do without a DDS electronic element and to set $p_1 = q_1$ or $p_2 = q_2$.

Details concerning direct digital synthesis of frequencies can be found, for example, in general, in "A technical tutorial on Digital Signal Synthesis", at http://www.analog.com/static/imported-files/tutorials/450968421DDS_Tutorial_rev12-2-99.pdf, or in the publication by Bar-Giora Goldberg, "Digital Frequency Synthesis Demystified—DDS and Fractional-N PLLs," LLH Technology Publishing, Eagle Rock 1999, ISBN 1-878707-47-7.

A possible use of a DDS electronic element would be stabilization according to the method described, in which, however, in deviation, M and N are equal to zero, and M' and N' are equal to 1 or are selected in such a manner that $M' \times f_A$ and $N' \times f_B$ lie as high as possible, but at most at the maximal input frequency of the DDS electronic element. It has been shown, however, that the maximal input frequency of commercially available DDS electronic elements is not high enough to achieve sufficient sensitivity of the phase-locked loop to deviations of $\Delta f_R$ from the nominal value. This is due to the fact that in the case of commercially available DDS electronic elements, the output frequency and thus the frequency used in the phase-locked loop is limited to typically 500 MHz, and thus the advantageous range of 1-20 GHz is not reached at the input of the phase detector. It has been shown that in the case of the obvious stabilization that has been described, asynchronous optical sampling is only possible with a time resolution in the range of approximately 500 fs, limited by timing jitter and resulting deviations of $\Delta f_R$ from the nominal value.

These problems are solved by stabilization according to the invention, with M and N not equal to zero, particularly so that $M \times f_A$ and $N \times f_B$ lie in the range of 900 MHz to 20000 MHz.

This has the advantage that simultaneously, the task of implementing a definable difference frequency is accomplished, and also the highest possible input frequencies are made available to the phase detector, which input frequencies are derived, in each instance, in phase-coherent manner, from the output signals of the photodetectors for conversion of the pulse trains into electrical signals, and this is accomplished by means of additive linking of signals at higher harmonics of the pulse frequencies, in the range of 1 GHz-20 GHz, and the output signals of the DDS electronic elements ahead of the phase detector. In this connection, the deciding factor is that the information concerning deviations of the relative pulse delay of the two laser pulse trains from their nominal value with a closed phase-locked loop is essentially obtained by way of use at the $M^{th}$ and the $N^{th}$ harmonic of the pulse frequencies of the pulsed lasers, but at the same time, the nominal difference of the pulse frequencies is essentially given by way of the setting of the DDS electronic modules. Each of these measures, seen in and of itself, would not be able to accomplish the regulation task in such a manner that asynchronous optical sampling would be possible at a time resolution below 100 fs.

According to another embodiment of the invention, the pulse repetition rates $f_A$ and $f_B$ of two pulsed lasers are stabilized for asynchronous optical sampling at values of approximately 1 GHz and a difference frequency of 2 kHz. In this connection, a concrete case of possible coupling could work with the following parameters: $f_A = 1$ GHz; M=N=10; M'=N'=1; $p_1=2$; $q_1=5$; $p_2=4000208$; $q_2=10^7$, as well as a positive prefix in front of M' and N', in each instance. From this, it would follow that $f_B = 999.998$ MHz, in other words $\Delta f_R = 2$ kHz. Suitable data recording systems possess a bandwidth in the range of B=100 MHz. The theoretically possible time resolution would be $\Delta \tau_B = 20$ fs, in this case. Experience has shown that this value is not achieved on the basis of a greater pulse duration of the pulsed lasers that are used or of residual deviations of $\Delta f_R$ from the nominal value, which the regulation loop does not compensate. A time resolution that is typically achieved with such a system lies in the range of 40 fs.

According to another embodiment of the invention, the pulse repetition rates $f_A$ and $f_B$ of two pulsed femtosecond lasers are stabilized, for asynchronous optical sampling, at values of approximately 1 GHz and a difference frequency of 2 kHz. Then, possible parameters are: $f_A$=1 GHz, M=N=10; M'=N'=1; $p_1$=2; $q_1$=5; $p_2$=4000200; $q_2$=10$^7$, as well as a positive prefix in front of M' and N', in each instance. From this, it also follows that $f_B$=999.998 MHz, in other words $\Delta f_R$=2 kHz.

The invention can be used in particularly advantageous manner for stabilization of the pulse repetition rates of femtosecond lasers at 100 MHz with a difference frequency of 200 Hz, for asynchronous optical sampling. In this case, only one DDS electronic element would actually be necessary, and either $p_1/q_1$=1 or $P_2/q_2$=1 could be set. In this connection, a concrete case of possible stabilization could work with the following parameters: $f_A$=100 MHz; M=N=100; M'=4, N'=10; $p_1$=$q_1$=1; $p_2$=4000208; $q_2$=10$^7$, as well as a positive prefix in front of M' and N', in each instance. From this, it would follow that $f_B$=99.9998 MHz, in other words $\Delta f_R$=200 Hz. The theoretically possible time resolution at a data recording rate of 100 MHz, in this case, would also be $\Delta \tau_B$=20 fs. In general, the invention can be used in particularly advantageous manner for femtosecond lasers with a pulse repetition rate in the range of 100 MHz, since there, a difference frequency in the range of 200 Hz is required to achieve a time resolution below 100 fs. This would be impossible to achieve when using a single sideband generator, since there, the unavoidable sidebands would bring about a strong systematic incorrect calibration of the time axis.

Applications of coupled pulsed lasers according to the invention particularly result from possible applications of asynchronous optical sampling. In concrete terms, apparatuses for gas spectroscopy and gas sensor systems in the THz frequency range can be implemented with asynchronous optical sampling. Such an apparatus is described in the publication by A. Bartels et al., "Terahertz-Spektroskopie mit High-Speed ASOPS [Terahertz spectroscopy with high-speed ASOPS]" tm—Technisches Messen [Technical Measuring] 75, 23-30 (2008). Also, by using a THz spectroscopy apparatus based on asynchronous optical sampling with lasers coupled according to the invention, it is possible to carry out read-out of resonant sensors (G. Klatt et al., "Rapid and precise read-out of terahertz sensor by high-speed asynchronous optical sampling," Electronics Letters 45, 310-311, 2009). Furthermore, asynchronous optical sampling can also be used for analysis of the layer structure of optically non-transparent media by means of so-called picosecond ultrasound. Such an application is described in the publication by T. Dekorsy et al., "Coherent acoustic phonons in nanostructures investigated by asynchronous optical sampling," Proceedings SPIE, vol. 6393, 63930H-11, 2006.

In a further aspect, the invention relates to a computer program product with instructions that can be carried out by a computer, for performing the method steps according to the method according to the invention as described above.

In a further aspect, the invention relates to a device for coupling a first and second laser, having an adjustable difference of their pulse frequencies, which is not equal to zero, whereby the device comprises:

- at least one photodetector for detection of the time progression of the light intensity of the pulses emitted by the first and second laser,
- means for derivation of a first harmonic signal and a signal of the M$^{th}$ harmonic from the time progression of the light intensity of the pulses emitted by the first laser,
- an electronic mixer for mixing the first harmonic signal and the signal of the M$^{th}$ harmonic, to obtain a first mixed signal,
- means for derivation of a second harmonic signal and a signal of the N$^{th}$ harmonic from the time progression of the light intensity of the pulses emitted by the second laser,
- an electronic mixer for mixing the second harmonic signal and the signal of the N$^{th}$ harmonic, to obtain a second mixed signal, whereby the first and second harmonic signal and the M$^{th}$ and N$^{th}$ harmonic are selected in such a manner that the frequencies of the first and second mixed signal are identical, whereby the device furthermore comprises a closed phase-locked loop for regulating the pulse frequency and pulse delay of the first and/or second laser, so that the relative phases of the first and second mixed signal remain constant in terms of time, and the frequencies of the first and second mixed signals remain identical.

Thus, the pulse frequency of at least one pulsed laser can be tuned by applying a setting signal. The photodetector serves for reception of the light pulses emitted by the pulsed lasers, and their conversion into an electrical signal. Furthermore, a phase detector can be included, the input signals of which are derived, in phase-coherent manner, from the output signals of the photodetectors.

Figure 2:
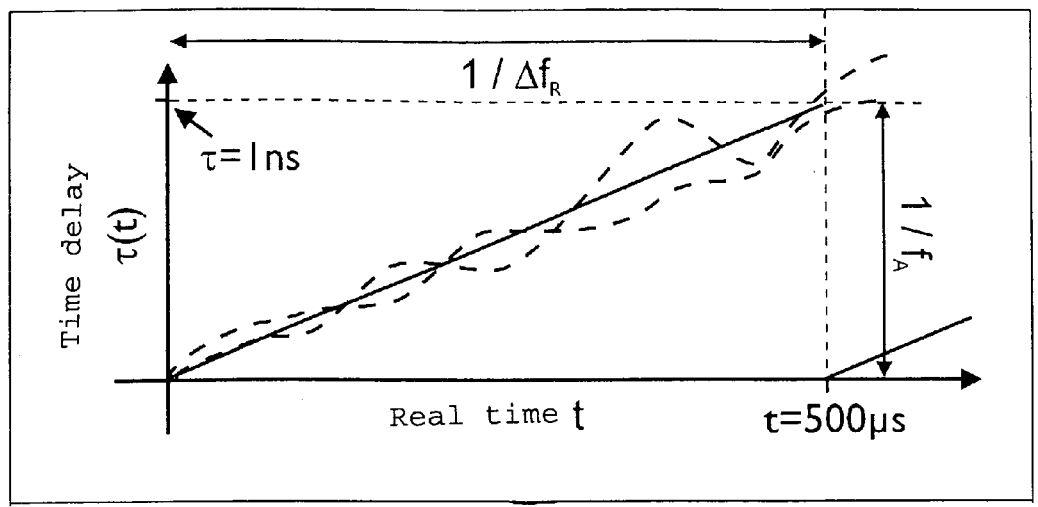
Figure 3:
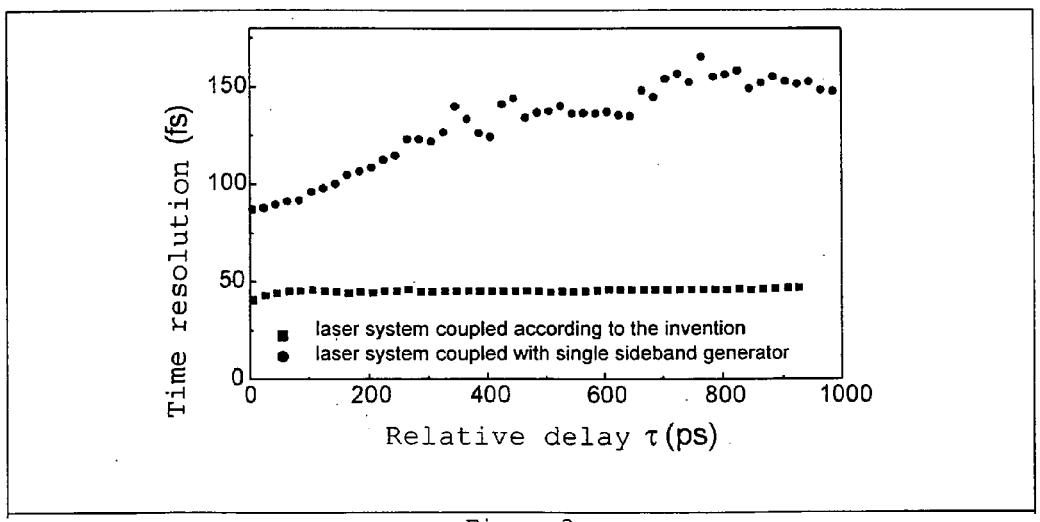
Figure 4:
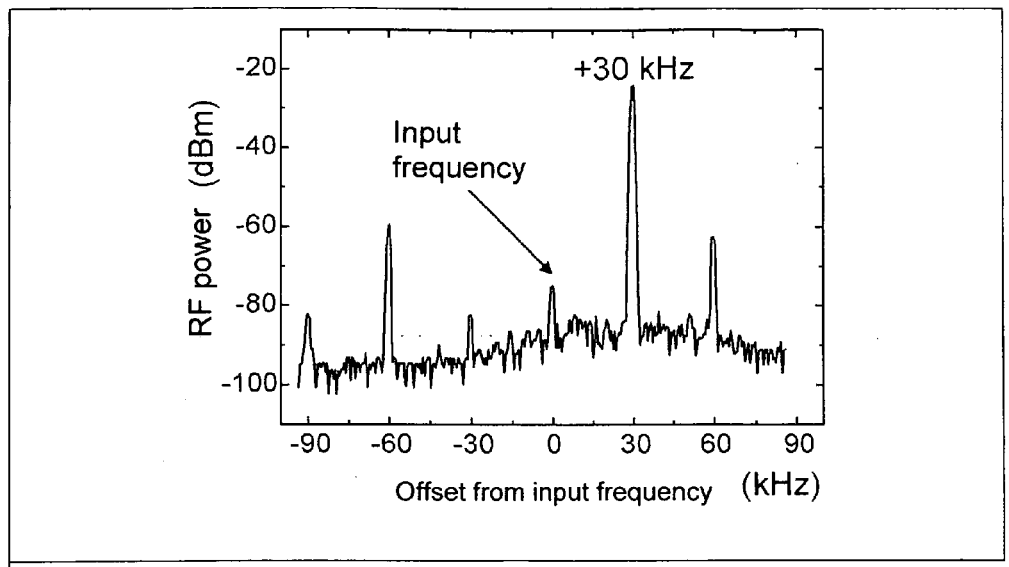
Figure 5:
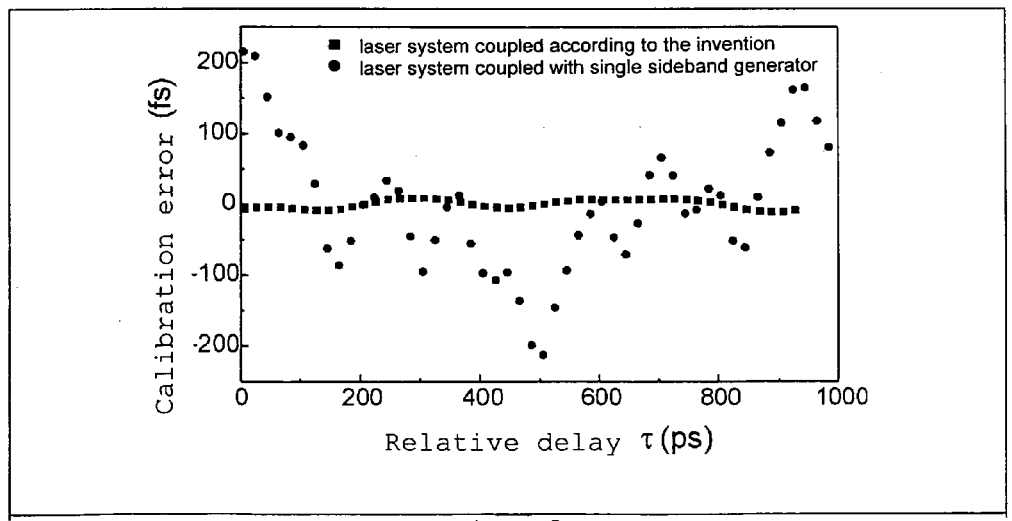
Figure 6:
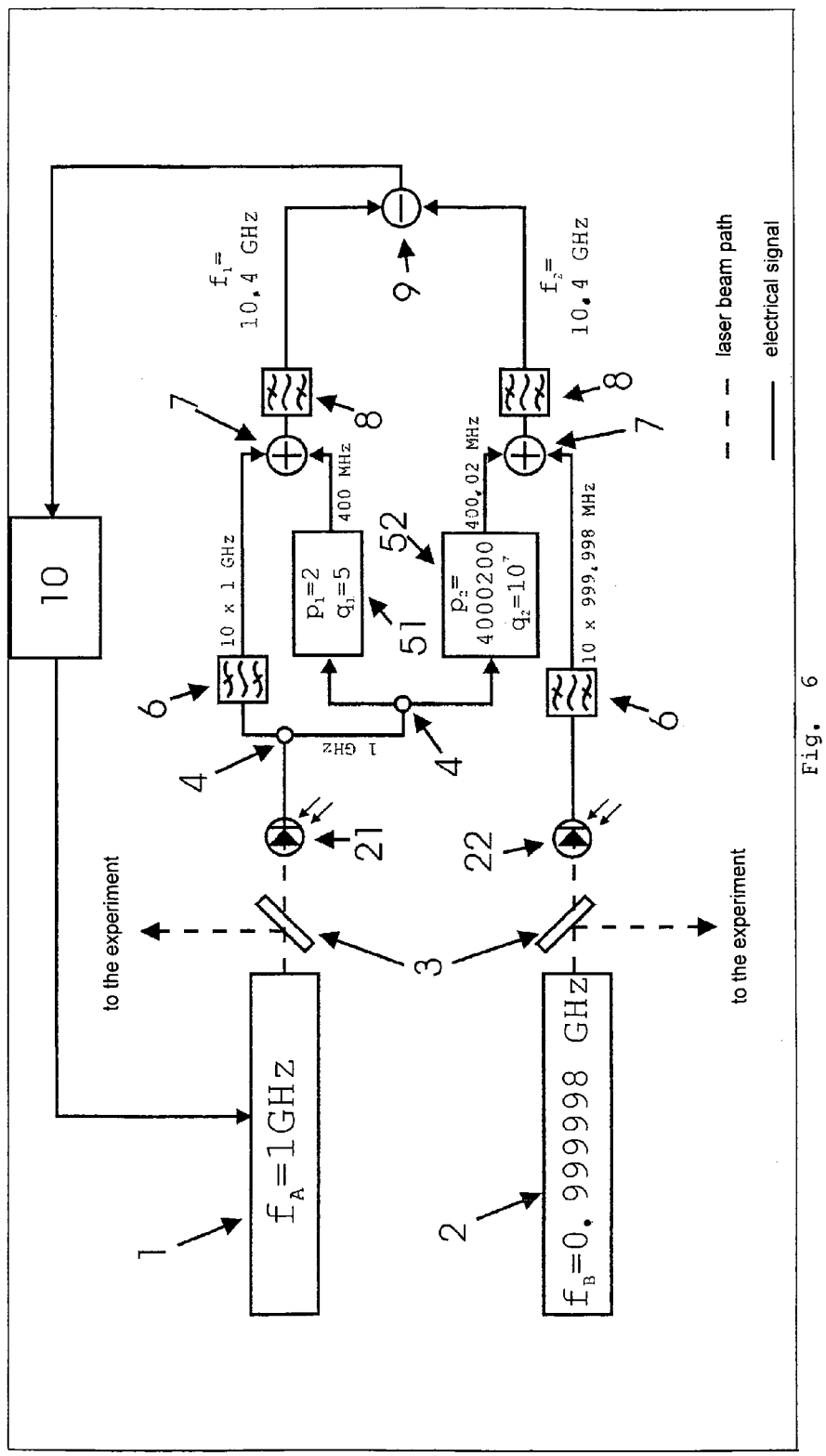
Figure 7:
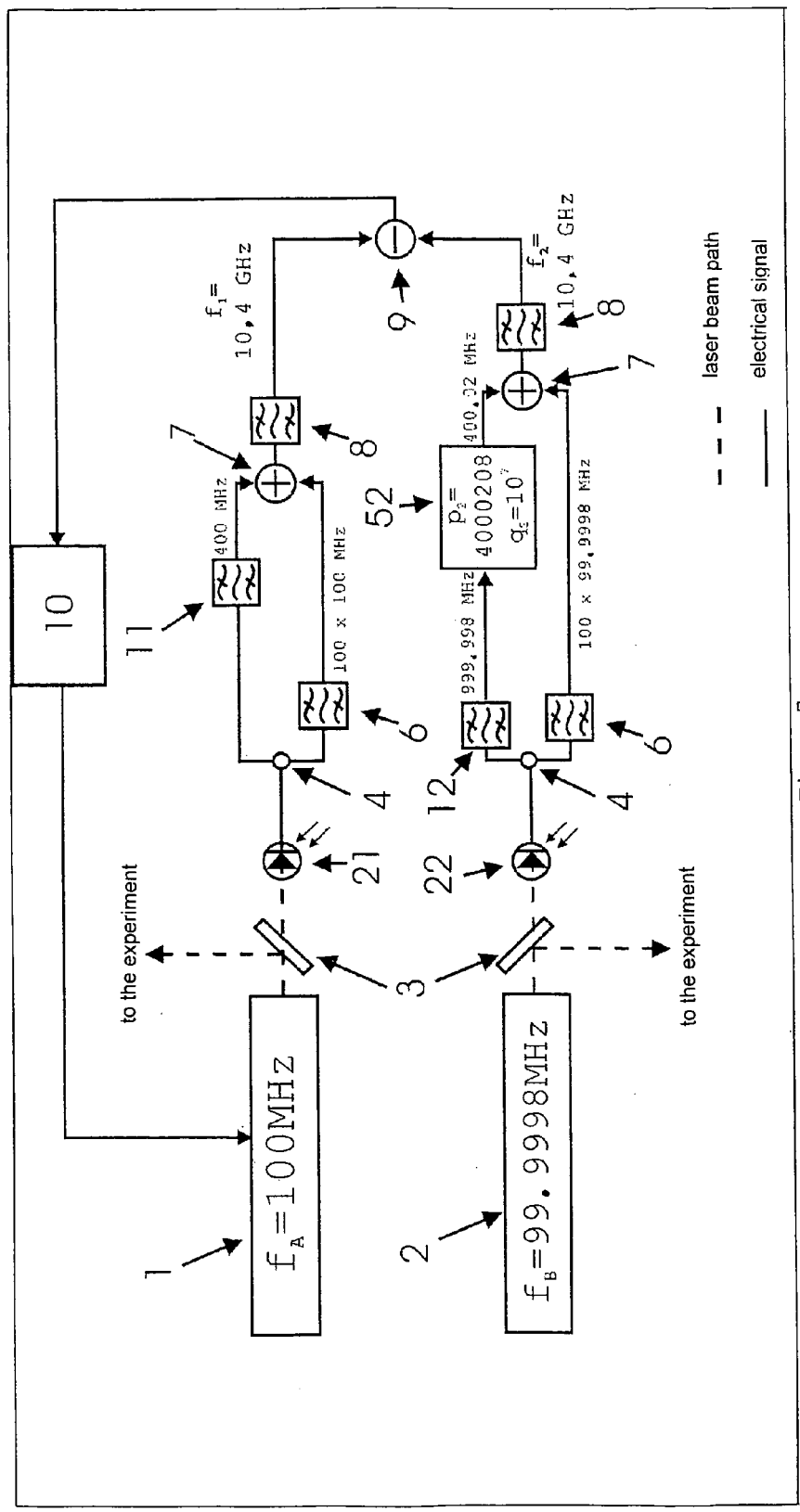

In the following, preferred embodiments of the inventions are explained in greater detail, using the drawings. These show:

FIG. 1: a coupled laser system with pulsed lasers at a pulse frequency of approximately 1 GHz, FIG. 2: the progression of the relative delay $\tau$ between a pulse from laser A and the pulse from laser B that immediately follows it, in terms of time, as a function of the real time t in the case of an ideally coupled system as shown in FIG. 1, and in the case of an insufficiently coupled system or a system that is not coupled, FIG. 3: the measured time resolution of a system for asynchronous optical sampling when using a coupled laser system as shown in FIG. 1 (square symbols) and when using a system in which the laser systems were coupled by means of a single sideband generator, at the third harmonic of the pulse frequencies (circular symbols), as a function of the relative delay $\tau$, FIG. 4: the output signal of a single sideband generator, which has received a harmonic signal at 3 GHz as an input signal, and which makes available a harmonic signal at 3 GHz+30 kHz as the desired output signal, FIG. 5: the deviation of the actual measured relative delay $\tau$ between a pulse from laser A and the pulse from laser B that immediately follows it, in terms of time, as a function of the real time t, from the ideal equation $\tau(t)=t\times\Delta f_R/f_A$ (calibration error) for a coupled system of two pulsed lasers (square symbols) and for a system that was coupled using a single sideband generator, at the 3$^{rd}$ harmonic of $f_A$ (circular symbols), as a function of the relative delay $\tau$, FIG. 6: a coupled laser system, FIG. 7: a coupled laser system with pulsed lasers at a pulse frequency of approximately 100 MHz.

In the following, elements that are similar to one another are identified with the same reference symbols.

A typical implementation of a method for coupling two pulsed lasers with an adjustable difference of the pulse frequencies, which is not equal to zero, according to the present invention, is outlined in FIG. 1. It works with two pulsed lasers (1) and (2) with a pulse frequency of 1 GHz and 0.999998 GHz, respectively, and a difference frequency of $\Delta f_R = 2$ kHz. Beam splitters (3) transmit a small proportion of the pulsed light and reflect the remaining light for use in an asynchronous optical sampling experiment, for example. The transmitted light illuminates photodetectors (21) and (22) with a cut-off frequency of greater than 10 GHz, which convert the pulse trains of the lasers into an electrical signal, in each instance. The electrical signals at first contain all the Fourier components up to the cut-off frequency of the photodetectors. Subsequently, the electrical output signal of the photodetector (21) is split up, with a power splitter (4), into two arms. In one arm, the pulsed signal is used at 1 GHz, as an input signal of a DDS electronic element (51), which is configured in such a manner that a harmonic signal with a frequency of 400 MHz is made available at the output. Therefore, it holds true that $p_1 = 2$ and $q_1 = 5$. In the second arm, only the $10^{th}$ harmonic of $f_A$ is allowed to pass through by a bandpass filter (6), and added to the output signal of the DDS electronic element (51) by means of an electronic mixer (7). Since the mixer (7) can also make a contribution in the difference frequency of its input signals as well as other undesirable contributions at a distance of 400 MHz from 10.4 GHz, it is followed by another bandpass filter (8), which only allows the sum of $f_1 = 10.4$ GHz to pass through. This signal at $f_1$ is then made available to the phase detector (9) as an input signal. Furthermore, the electrical output signal of the photodetector (22) is also split up into two arms with a power splitter (4). In one arm, the pulsed signal is used at 0.999998 GHz as an input signal of a DDS electronic element (52), which is configured in such a manner that a harmonic signal with a frequency of 400.02 MHz is made available at the output. It therefore holds true that $p_2 = 4000208$ and $q_2 = 10^7$. In the second arm, only the $10^{th}$ harmonic of $f_B$ is allowed to pass through, by a bandpass filter (6), and added to the output signal of the DDS electronic element (52) by means of an electronic mixer (7). Since the mixer (7) can also make a contribution in the difference frequency of its input signals as well as other undesirable contributions at a distance of 400 MHz from 10.4 GHz, it in turn is followed by another bandpass filter (8), which only allows the sum of $f_2 = 10.4$ GHz to pass through. This signal at $f_2$ is then made available to the phase detector (9) as a second input signal. The output signal of the phase detector (9) is proportional to the relative phase of its input signals. This signal is now amplified with a loop amplifier (10) (in most cases a proportional-integral amplifier), and used as a setting signal for monitoring the pulse frequency $f_A$ and pulse delay $t_A$ of laser A, in such a manner that $f_1 = f_2$, and the phase between the input signals of the phase detector (9) is constant.

FIG. 2 shows the progression of the relative delay τ between a pulse from laser A and the pulse from laser B that immediately follows it, in terms of time, as a function of the real time t, with an ideally coupled system as shown in FIG. 1, as a solid line. The broken lines show the progression that deviates from the ideal behavior, in the case of an insufficiently coupled system or one that is not coupled. Such a system would only be usable for asynchronous optical sampling with restrictions, or not at all, since the calibration of the relative delay would be incorrect and furthermore different for every measurement cycle, and thus would bring about an incorrect calibration, in terms of time, and blurring of the signal.

FIG. 3 shows the measured time resolution of a system for asynchronous optical sampling when using a coupled laser system as shown in FIG. 1 (square symbols) and when using a system in which the laser systems were coupled by means of a single sideband generator, at the third harmonic of the pulse frequencies (circular symbols), as a function of τ. Suitable data recording systems possess a bandwidth in the range of approximately B=100 MHz. With a system as shown in FIG. 1, it is therefore theoretically possible to achieve a time resolution of 20 fs, due to B. It is true that this value is not achieved for the system, as can be seen from the data shown. However, this is essentially attributable to the fact that the duration of the laser pulses used was 40 fs. Instead, in the entire range from τ=0 ps to τ=1000 ps, approximately 40 fs time resolution was achieved, limited by the duration of the laser pulses. In contrast, when using a system coupled with a single sideband generator at the third harmonic of the pulse frequencies, only a time resolution in the range of 100 fs would be achieved. Furthermore, the time resolution deteriorates disadvantageously as the values of τ become greater, towards greater values, up to approximately 170 fs. These disadvantages are attributable to the fact that the phase-locked loop for coupling the pulsed lasers cannot efficiently eliminate timing jitter when using a single sideband generator.

FIG. 4 shows the output signal of a single sideband generator, which has received a harmonic signal at an input frequency of 3 GHz as an input signal, and makes available a harmonic signal at 3 GHz+30 kHz as the desired output signal. The input signal could lie, for example, at the $3^{rd}$ harmonic of the pulse frequency of a pulsed laser with a pulse frequency of 1 GHz. Then the output signal, which is shifted by 30 kHz, could serve as a reference signal in a phase-locked loop for coupling the pulse frequency of a second pulsed laser at a distance of 10 kHz, in that a signal at the $3^{rd}$ harmonic of the second pulsed laser is coupled to the output signal of the single sideband generator. However, it can be seen that the single sideband generator also has sidebands at a distance of a multiple of 30 kHz, in addition to the useful signal at 3 GHz+30 kHz. These sidebands result in a parasitic, systematic modulation of the relative pulse delay $t_A - t_B$ between the pulse trains of the pulsed lasers, in a subsequent phase-locked loop, which pulse trains bring about an undesirable deviation from the behavior in the case of ideal stabilization with a fixed difference frequency and a fixed relative pulse delay. They thereby bring about an experimental calibration error. This effect becomes stronger, the less the difference frequency, since the sidebands then move further into the regulation frequency range of the phase-locked loop. This is the reason why in practice, single sideband generators below $\Delta f_R = 10$ kHz can no longer be used, for practical purposes.

FIG. 5 shows the deviation of the actual measured relative delay τ between a pulse from laser A and the pulse from laser B that immediately follows it, in terms of time, as a function of the real time t, from the ideal equation $\tau(t) = t \times f_R / f_A$ (calibration error) for a coupled system of two pulsed lasers according to the invention (square symbols) and for a system that was coupled using a single sideband generator at the 3rd harmonic of $f_A$ (circular symbols), as a function of the relative delay τ. In the case of both systems, $f_A = 1$ GHz and $\Delta f_R = 2$ kHz. In the case of a system coupled according to the invention, the amount of the measured calibration error lies below 10 fs. In contrast, in the case of a system not coupled according to the invention, but rather using a single sideband generator, at the third harmonic of the pulse frequencies, a calibration error of more than 200 fs can be observed. This error is caused by the sidebands at the output of the single sideband generator, which cause a parasitic, systematic modulation of the relative pulse delay $t_A - t_B$ within a phase-locked loop.

A typical implementation of a method for coupling two pulsed lasers having an adjustable difference of the pulse frequencies, which is not equal to zero, is outlined in FIG. 6.

It works with two pulsed lasers (1) and (2) with 1 GHz and 0.999998 GHz pulse frequency, respectively, and a difference frequency of $\Delta f_R = 2$ kHz. Beam splitters (3) transmit a small proportion of the pulsed light and reflect the remaining light for use in an asynchronous optical sampling experiment, for example. The transmitted light illuminates photodetectors (21) and (22) with a cut-off frequency of greater than 10 GHz, which convert the pulse trains of the lasers into an electrical signal, in each instance. The electrical signals at first contain all the Fourier components up to the cut-off frequency of the photodetectors. Subsequently, the electrical output signal of the photodetector (21) is at first split into two arms by a power splitter (4). In one arm, only the $10^{th}$ harmonic of $f_A$ is allowed to pass through, by a bandpass filter (6). The signal in the second arm, in turn, is divided up into two further arms, by a power splitter (4). The pulsed signal at 1 GHz of one of these additional arms is made available to a DDS electronic element (51) as an input signal, which element is configured in such a manner that a harmonic signal with a frequency of 400 MHz is made available at the output. It therefore holds true that $p_1=2$ and $q_1=5$. The output signal of the DDS electronic element (51) is added to the signal at the $10^{th}$ harmonic of $f_A$ by means of an electronic mixer (7). Since the mixer (7) can also make a contribution in the difference frequency of its input signals as well as other undesirable contributions at a distance of 400 MHz from 10.4 GHz, it is followed by another bandpass filter (8), which only allows the sum of $f_1=10.4$ GHz to pass through. This signal at $f_1$ is then made available to the phase detector (9) as an input signal. The pulsed signal at 1 GHz of the second additional arm is made available to a DDS electronic element (52) as an input signal, which element is configured in such a manner that a harmonic signal with a frequency of 400.02 MHz is made available at the output. It therefore holds true that $p_2=4000200$ and $q_2=10^7$. Furthermore, the electrical output signal of the photodetector (22) is filtered with a filter (6), in such a manner that only the $10^{th}$ harmonic of $f_B$ is allowed to pass through. This signal is then added to the output signal of the DDS electronic element (52) by means of an electronic mixer (7). Since the mixer (7) can also make a contribution in the difference frequency of its input signals as well as other undesirable contributions at a distance of 400 MHz from 10.4 GHz, it in turn is followed by another bandpass filter (8), which only allows the sum of $f_2=10.4$ GHz to pass through. This signal at $f_2$ is then made available to the phase detector (9) as a second input signal. The output signal of the phase detector (9) is proportional to the relative phase of its input signals. This signal is now amplified with a loop amplifier (10) (in most cases a proportional-integral amplifier), and used as a setting signal for monitoring the pulse frequency $f_A$ and pulse delay $t_A$ of laser A, in such a manner that $f_1=f_2$, and the phase between the input signals of the phase detector (9) is constant.

Another typical implementation of a method for coupling of two pulsed lasers having an adjustable difference of the pulse frequencies, which is not equal to zero, is outlined in FIG. 7. It works with two pulsed lasers (1) and (2) having a pulse frequency of 100 MHz and 99.9998 MHz, respectively, and a difference frequency of $\Delta f_R = 200$ Hz. Beam splitters (3) transmit a small proportion of the pulsed light and reflect the remaining light for use in an asynchronous optical sampling experiment, for example. The transmitted light illuminates photodetectors (21) and (22) with a cut-off frequency of greater than 10 GHz, which convert pulse trains of the lasers into an electrical signal, in each instance. The electrical signals at first contain all the Fourier components up to the cut-off frequency of the photodetectors. Subsequently, the electrical output signal of the photodetector (21) is split up into two arms with a power splitter (4). In one arm, only the $4^{th}$ harmonic of $f_A$ is allowed to pass through (corresponding to M'=4), by a bandpass filter (11). No DDS electronic element is applied to this signal, therefore it holds true that $p_1=1$ and $q_1=1$. In the second arm, only the $100^{th}$ harmonic of $f_A$ is permitted to pass through by a bandpass filter (6), and added to the signal at the $4^{th}$ harmonic of $f_A$ by means of an electronic mixer (7). Since the mixer (7) can also make a contribution in the difference frequency of its input signals as well as other undesirable contributions at a distance of 400 MHz from 10.4 GHz, it is followed by another bandpass filter (8) that only allows the sum of $f_1=10.4$ GHz to pass through. This signal at $f_1$ is then made available to the phase detector (9) as an input signal. Furthermore, the electrical output signal of the photodetector (22) is also split into two arms with a power splitter (4). In one arm, only the $10^{th}$ harmonic of $f_B$ (corresponding to N'=10) is allowed to pass through by a bandpass filter (12), and used as an input signal of a DDS electronic element (52), which is configured in such a manner that a harmonic signal having a frequency of 400.02 MHz is made available at the output. It therefore holds true that $p_2=4000208$ and $q_2=10^7$. In the second arm, only the $100^{th}$ harmonic of $f_B$ is allowed to pass through by a bandpass filter (6), and added to the output signal of the DDS electronic element (52) by means of an electronic mixer (7). Since the mixer (7) can also make a contribution in the difference frequency of its input signals as well as other undesirable contributions at a distance of 400 MHz from 10.4 GHz, it in turn is followed by another bandpass filter (8), which only allows the sum of $f_2=10.4$ GHz to pass through. This signal at $f_2$ is then made available to the phase detector (9) as a second input signal. The output signal of the phase detector (9) is proportional to the relative phase of its input signals. This signal is now amplified with a loop amplifier (10) (in most cases a proportional-integral amplifier), and used as a setting signal for monitoring the pulse frequency $f_A$ and pulse delay $t_A$ of laser A, in such a manner that $f_1=f_2$, and the phase between the input signals of the phase detector (9) is constant.

The invention claimed is:

1. Method for coupling a first laser (1) and second laser having an adjustable difference of their pulse frequencies, which is not equal to zero, wherein the method comprises the following steps:
   derivation of a first harmonic signal and a signal of the $M^{th}$ harmonic from the time progression of the light intensity of the pulses emitted by the first laser,
   mixing of the first harmonic signal and the signal of the $M^{th}$ harmonic, in order to obtain a first mixed signal,
   derivation of a second harmonic signal from the time progression of the light intensity of the pulses emitted by the first laser or from the time progression of the light intensity of the pulses emitted by the second laser and a signal of the $N^{th}$ harmonic from the time progression of the light intensity of the pulses emitted by the second laser,
   mixing of the second harmonic signal and the signal of the $N^{th}$ harmonic, in order to obtain a second mixed signal,
wherein the first and second harmonic signal and the $M^{th}$ and $N^{th}$ harmonic are selected in such a manner that the frequencies of the first and second mixed signal are identical, wherein the method furthermore comprises:
   regulation of the pulse frequency and pulse delay of the first laser in a closed phase-locked loop, in such a manner that the relative phases of the first and second mixed signal remain constant, in terms of time, and the frequencies of the first and second mixed signal remain identical.

2. Method according to claim 1, wherein
the derivation of the first harmonic signal takes place by means of manipulation at the pulse frequency or an $M'^{th}$ harmonic of the pulse frequency of the first laser, with an electronic element,
the derivation of the second harmonic signal takes place by means of manipulation at the pulse frequency or an $N'^{th}$ harmonic of the pulse frequency of the first or second laser, with an electronic element.

3. Method according to claim 2, wherein the $M'^{th}$ and $N'^{th}$ harmonics of the pulse frequency of the first and second laser are selected in such a manner that their frequencies lie maximally at the highest possible input frequency of the electronic element being used.

4. Method according to claim 3, wherein the $M'^{th}$ and $N'^{th}$ harmonics of the pulse frequency of the first and second laser are selected in such a manner that their frequencies lie between 900 and 1100 MHz.

5. Method according to claim 2, wherein the electronic element comprises an electronic element for direct digital synthesis (DDS) (51, 52).

6. Method according to claim 1, wherein the derivation of the $M^{th}$ and $N^{th}$ harmonic takes place with an electronic element, wherein the $M^{th}$ and $N^{th}$ harmonics are selected in such a manner that their frequencies lie above the highest possible input frequency of the electronic element being used.

7. Method according to claim 6, wherein the $M^{th}$ and $N^{th}$ harmonics are selected in such a manner that their frequencies lie between 900 and 20000 MHz.

8. Method according to claim 1, wherein the first laser emits pulses at a pulse frequency $f_A$ and the second laser emits pulses at a pulse frequency $f_B$, wherein the signal of the $M^{th}$ harmonic is given by $M \times f_A$ and the signal of the $N^{th}$ harmonic is given by $N \times f_B$,
wherein the frequency
of the first harmonic signal is given by $f_1 = (M \pm M' \times p_1/q_1) \times f_A$,
of the second harmonic signal is given by $f_2 = (N \pm N' \times p_2/q_2) \times f_B$, or $f_2 = N \times f_B \pm N' \times (p_2/q_2) \times f_A$,
where $p_1$ and $q_1$ are whole numbers with $p_1$ less than or equal to $q_1$, and $p_2$ and $q_2$ are whole numbers with $p_2$ less than or equal to $q_2$, where M, M', N, N', $p_1$, $p_2$, $q_1$, $q_2$ can be preselected and determine the value of the difference of the pulse frequency $f_A - f_B$ of the two pulsed lasers (1, 2) at $f_1 = f_2$ and constant phase.

9. Computer program product with instructions that can be performed by a computer, for implementation of the method steps according to the method, according to claim 1.

10. Device for coupling a first laser (1) and second laser having an adjustable difference of their pulse frequencies, which is not equal to zero, wherein the device comprises:
at least one photodetector (21) for detection of the time progression of the light intensity of the pulses emitted by the first and second laser,
means (6; 51) for derivation of a first harmonic signal and a signal of the $M^{th}$ harmonic from the time progression of the light intensity of the pulses emitted by the first laser,
an electronic mixer (7) for mixing the first harmonic signal and the signal of the $M^{th}$ harmonic, to obtain a first mixed signal,
means (6; 52) for derivation of a second harmonic signal from the time progression of the light intensity of the pulses emitted by the first laser or from the time progression of the light intensity of the pulses emitted by the second laser and a signal of the $N^{th}$ harmonic from the time progression of the light intensity of the pulses emitted by the second laser,
an electronic mixer (7) for mixing the second harmonic signal and the signal of the $N^{th}$ harmonic, to obtain a second mixed signal,
wherein the first and second harmonic signal and the $M^{th}$ and $N^{th}$ harmonic are selected in such a manner that the frequencies of the first and second mixed signal are identical, whereby the device furthermore comprises:
a closed phase-locked loop (9; 10) for regulating the pulse frequency and pulse delay of the first laser, so that the relative phases of the first and second mixed signal remain constant in terms of time, and the frequencies of the first and second mixed signals remain identical.

* * * * *